United States Patent [19]

Dodd et al.

[11] Patent Number: 5,074,388
[45] Date of Patent: Dec. 24, 1991

[54] VEHICLE BRAKING SYSTEM

[75] Inventors: Albert E. Dodd, Rednal; Ian J. Sheppard, Kenilworth, both of Great Britain

[73] Assignee: Lucas Industries Public Limited Company, Birmingham, England

[21] Appl. No.: 485,504

[22] Filed: Feb. 27, 1990

[30] Foreign Application Priority Data

Mar. 2, 1989 [GB] United Kingdom ............... 8904812
Mar. 3, 1989 [GB] United Kingdom ............... 8904929

[51] Int. Cl.⁵ .......................................... F16D 65/36
[52] U.S. Cl. ................................ 188/156; 188/72.6; 188/325
[58] Field of Search ............. 188/71.1, 71.2, 72.1, 188/72.6–72.9, 78, 325, 156, 26, 343, 382, 157, 344; 267/228, 256

[56] References Cited

U.S. PATENT DOCUMENTS

| 4,036,330 | 7/1977 | Henning et al. | 188/72.8 |
| 4,193,479 | 3/1980 | Quilici | 188/72.9 X |
| 4,596,316 | 6/1986 | Crossman | 188/72.8 X |
| 4,784,244 | 11/1988 | Carre et al. | 188/156 |
| 4,804,073 | 2/1989 | Taig et al. | 188/72.1 |
| 4,811,821 | 3/1989 | Wrench | 188/79.62 |

Primary Examiner—Robert J. Oberleitner
Attorney, Agent, or Firm—Staas & Halsey

[57] ABSTRACT

A brake actuator has a housing (4) containing a pair of brake-applying members (9, 10) interengaged by way of a threaded connection (11) to form a strut of which the length is variable by rotation of one of the members. One (9) of the members has a gear formation (16) thereon meshing with a corresponding formation (22) on a drive gear (21). The formation (22) has an extended profile permitting simultaneous rotational and translational movements of the member (9) relative to the drive gear (21) so that rotation of the drive gear causes expansion and contraction of the strut for brake actuation. The brake actuator housing (4) is mounted at a location adjacent the wheel while a power unit (10) is carried by a suspension member (1) in order to decrease noise and vibration transmition.

14 Claims, 3 Drawing Sheets

VEHICLE BRAKING SYSTEM

BACKGROUND OF THE INVENTION

This invention relates to a vehicle braking system of the general kind in which a brake actuator mounted adjacent a vehicle wheel to be braked is coupled by an operating mechanism to a remote electrically operated power device.

In one known proposal of this general kind, an actuator carried adjacent a wheel to be braked is operated from a chassis-mounted power device by way of a rod or cable mechanism. With such an arrangement, not only does relative movement between the brake and chassis disturb brake performance but noise from the power device is transmitted into the vehicle body.

It has also been proposed to mount an electric drive motor for a brake actuator at a location adjacent the actuator on structure supporting the vehicle wheel. This arrangement is not ideal because not only does the weight of the motor increase the unsprung weight of the vehicle, but the motor is located in a harsh operating environment and is difficult to protect from road dirt and other contaminants impinging thereon. Moreover, only a relatively small compact motor can usually be accommodated, because of the restricted space available adjacent the brake actuator, and this limits the available braking power.

SUMMARY OF THE INVENTION

An object of the present invention is to provide a vehicle braking system of the aforesaid general kind in which the disadvantages referred to are alleviated or avoided.

According to the present invention, a vehicle braking system comprises a brake actuator mounted, in use, adjacent a vehicle wheel to be braked and an electrically operated power device carried, at a location remote from said wheel, by a suspension member of the vehicle associated with that wheel, and drive transmission means interconnecting the power device and brake actuator.

Preferably, the power device, conveniently in the form of an electric motor, is carried by said suspension member adjacent a location at which the member is connected to the suspended vehicle body.

Desirably, when the suspension member is connected to the body by way of a noise isolation device, such as a resilient bush for example, the power device is disposed at the wheel side of said isolation device.

The brake actuator may conveniently comprise a housing containing a pair of brake applying members interengaged by way of a threaded connection to form a strut of which the length is variable by rotation of one of the members, said one member having a gear formation thereon meshing with a corresponding formation on a drive gear in such a manner as to form a drive connection which permits simultaneous rotational and translational movements of said one member relative to the drive gear, whereby rotation of the drive gear by motive means causes expansion and contraction of the strut for brake actuation.

Typically, the drive gear has a longer gear profile than said one member in order to permit said simultaneous rotational and translational movements of said one member. Conveniently, the gear formation of said one member is of larger diameter than said drive gear in order to provide an input gear reduction.

Preferably, said threaded connection is non-reversible and extension and contraction of the strut are effected by rotation of said one member in respective opposed directions.

In one convenient arrangement said drive gear is provided with a further gear formation of larger diameter than the drive gear which meshes with a spur pinion of smaller diameter than said further gear formation to provide a further stage of input gear reduction, said spur pinion being drivable by said motive means via a rotatable drive input member.

BRIEF DESCRIPTION OF THE DRAWINGS

The invention will now be described, by way of example, with reference to the accompanying drawings in which.

DETAILED DESCRIPTION OF THE PREFERRED EMBODIMENTS

Figure 1:
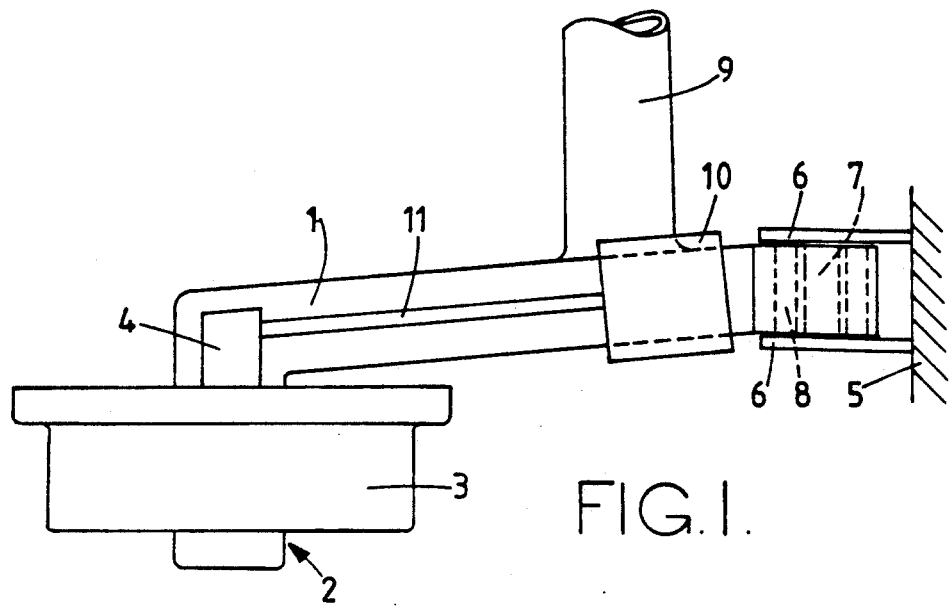
FIG. 1 is a diagrammatic plan view of one form of the vehicle braking system of the invention.
Figure 2:
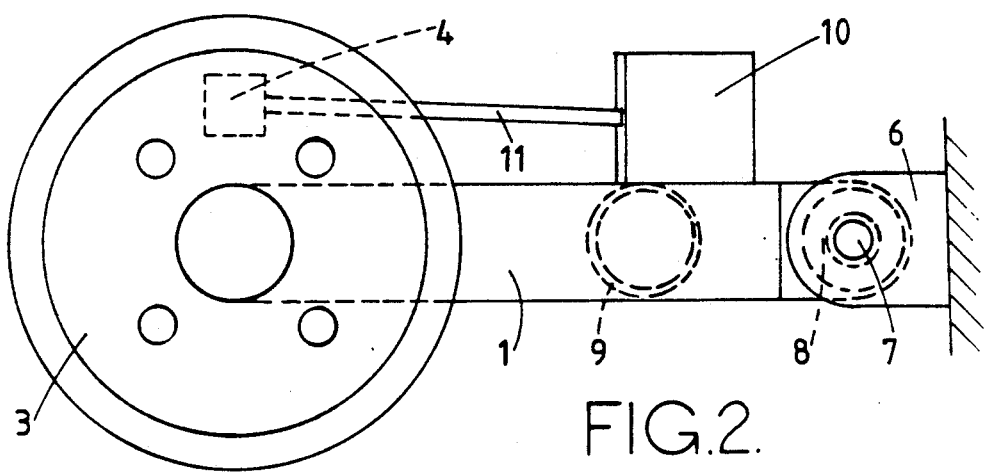
FIG. 2 is a side elevation of the system of FIG. 1.

Referring to FIGS. 1 and 2, these illustrate a suspension arm 1, on the free end of which is mounted a hub assembly, indicated generally at 2, of which a brake drum can be seen at 3. A brake actuator 4, which may be of any convenient mechanical or hydraulic type, is carried by the hub assembly 2 and would normally be attached to a back plate of the brake which, in the case illustrated, would also carry a pair of brake shoes for separation by the actuator into braking engagement with the drum 3.

The suspension arm 1 is carried by a body or chassis member of the vehicle, part of which is represented at 5. A pair of spaced parallel lugs 6 are firmly secured to the body or chassis member and the suspension arm is pivotally connected to the lugs by way of a pin 7 passing through an end portion of the arm and secured to the lugs 6. The pin 7 is surrounded, within the end portion of the arm through which it passes, by a resilient rubber bush 8 which serves to minimise the degree of noise transmitted to the chassis 5 from the wheel and suspension arm assembly. In the particular case illustrated, the suspension arm 1 is connected by a beam axle 9 to a similar suspension arm at the opposite side of the vehicle.

The energy for operating the brake actuator 4 is derived from a power device in the form of an electric motor 10 which is securely mounted on the suspension arm 1 at a location adjacent to the connection of the arm with the chassis 5. Drive transmission means, illustrated as a rod 11, interconnects the motor 10 and actuator 4 and is rotatable or movable in translation, to transmit operating force from the motor to the actuator, in conventional manner.

It will be seen that by mounting the power device 10 on the suspension arm carrying the wheel to be braked by operation of that device, the contribution made by the device to the unsprung weight of the vehicle is rendered insignificant and, moreover, the relationship between the motor and actuator is fixed, thereby eliminating the disturbances in braking performance found in some conventional systems. In addition, the actuator is mounted at a location remote from the heaviest potential contamination and can be readily protected to any extent necessary. Since the suspension arm 1 carrying the motor 10 is insulated physically from the chassis by means of the resilient bush 8, transmission to the chassis of noises arising in the motor is substantially prevented.

Figure 3:
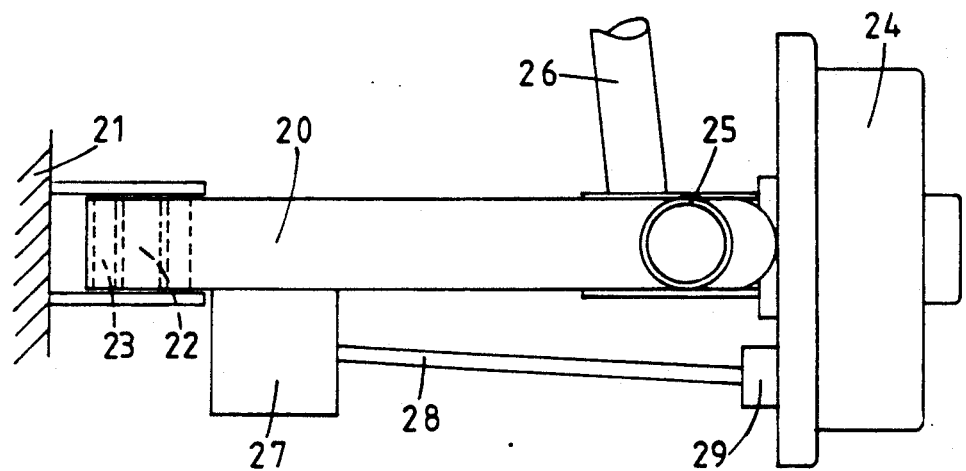
FIG. 3 is a plan view of another embodiment of the vehicle braking system of the invention.
Figure 4:
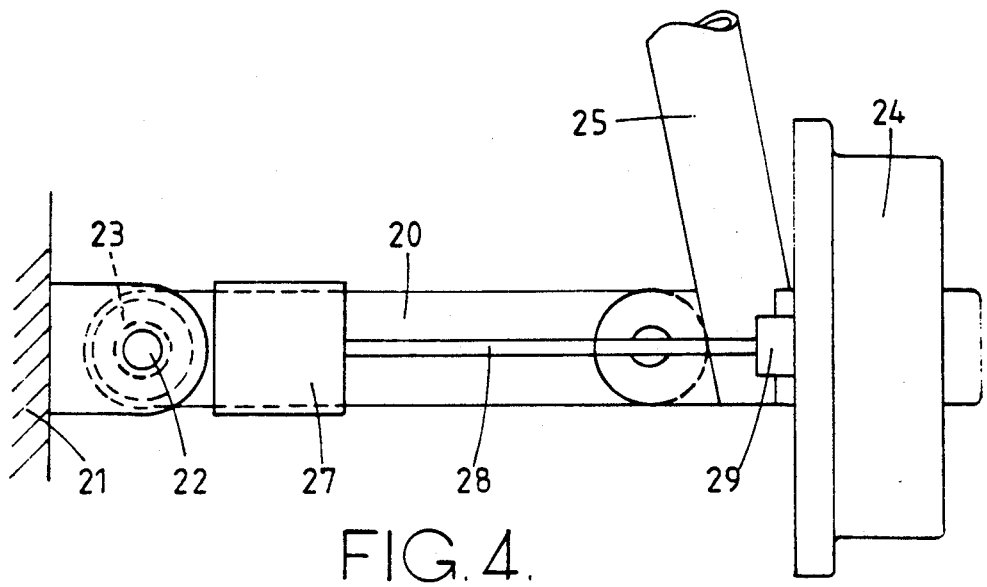
FIG. 4 is a rear view of the system of FIG. 3.

The alternative braking system illustrated in FIGS. 3 and 4 is associated with another type of vehicle suspension system. In this arrangement, a suspension arm 20 is mounted on a body or chassis 21 by way of a pin 22 and resilient bush 23 similar to that illustrated for the previous embodiment. The suspension arm 20 again carries a hub assembly, including a brake drum 24, and is associated with a generally vertically extending damper 25. The arm is restrained in the direction rear to front by a trailing link 26, in conventional manner. In this embodiment, the power device 27, conveniently in the form of an electric motor, is mounted on a rearwardly facing side of the suspension arm 20, again in the vicinity of the connection of that arm to the vehicle body or chassis 21. An actuator linkage, in the form of a rod 28, drivingly connects the motor 27 to a brake actuator 29 mounted on the brake back plate (not shown) as before. The embodiment of FIGS. 3 and 4 gives rise to the advantages enumerated above in connection with the embodiment of FIGS. 1 and 2.

It will be understood that the braking system of the invention can be incorporated in any vehicle suspension system in which a suspension arm or similar element is connected to a vehicle body or chassis and serves to support a road wheel. The force transmission element illustrated as a rod, may alternatively be a flexible element, such as a cable, arranged to transmit torque or tensile forces. The drive device, exemplified as a motor, may be a conventional D.C. motor or alternatively a stepper motor, preferably of the switched reluctance type. The latter is particularly suitable for incorporation into an "intelligent" braking system which operates under the influence of an electronic controller, because its position at any instant relative to a datum position is accurately known and may be stored in a computer, enabling a number of ancillary functions to be performed. For example, it is possible to use a type of actuator, of which an example is described hereafter, which locks in its operative "brakes on" condition and requires reverse operation to release the brakes. With such an actuator, the drive motor may be controlled such that the "brakes on" condition is maintained, thereby providing a parking brake function. Similarly, by providing appropriate sensed parameters to a control computer, the motor is able to actuate a brake in order to perform anti-lock braking and traction control modes. In a further alternative arrangement, a solenoid may be employed as the power device, effecting linear instead of rotary drive to the actuator.

Figure 5:
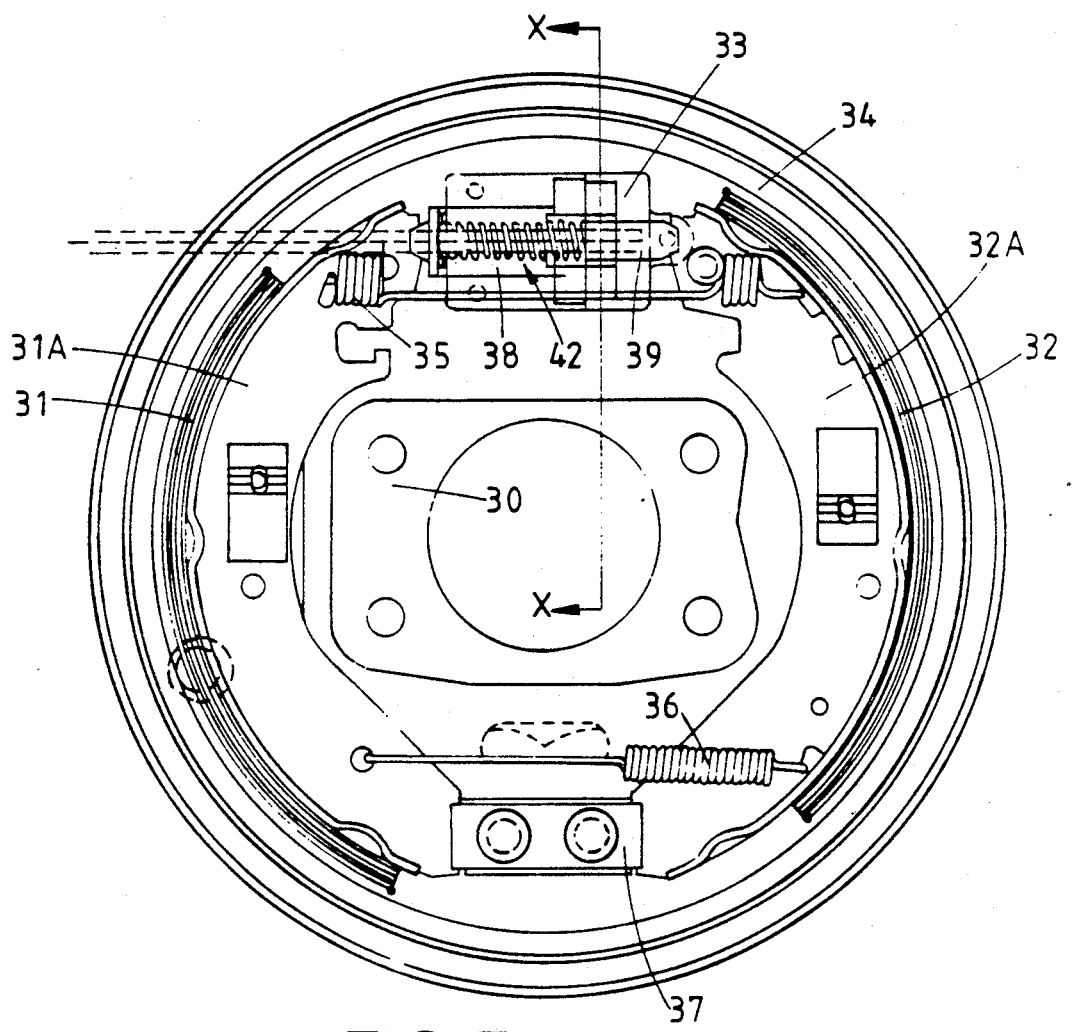
FIG. 5 is an end view of an internal shoe drum brake forming part of the braking system of the present invention.

Referring to FIG. 5 of the drawings, this illustrates an internal shoe drum brake having a back plate 30 carrying a pair of brake shoes 31, 32. An actuator 33 is rigidly mouneed on the back plate 30 between a pair of adjacent shoe ends and is operable to move the shoes outwardly into braking engagement with a surrounding brake drum 34 against the action of a pair of shoe return springs 35, 36. The other pair of adjacent shoe ends engage a torque-r-eacting abutment member 37 rigidly fixed to the back plate. The brake illustrated will assume a leading-trailing configuration for both directions of rotation of the brake drum 34. The actuator 33 includes a pair of brake applying members 38, 39 having respective end slots 40, 41 (FIG. 7) in which are engaged respectively the webs 31A, 32A of the shoes 31, 32. The members 38, 39 are interconnected by way of a screw thread connection, illustrated generally at 42, to form a strut of which the length may be varied by causing relative rotation between the strut parts 38, 39 in the manner to be described.

Figure 6:
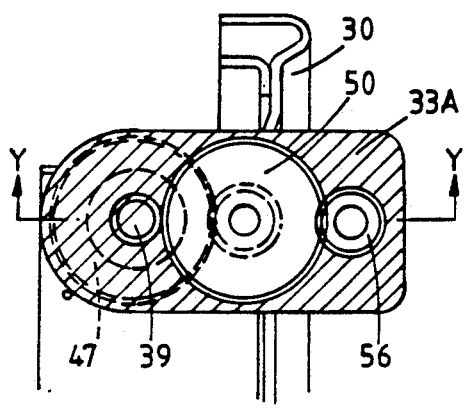
FIG. 6 is a cross-section to an enlarged scale along the line X—X of FIG. 5.
Figure 7:
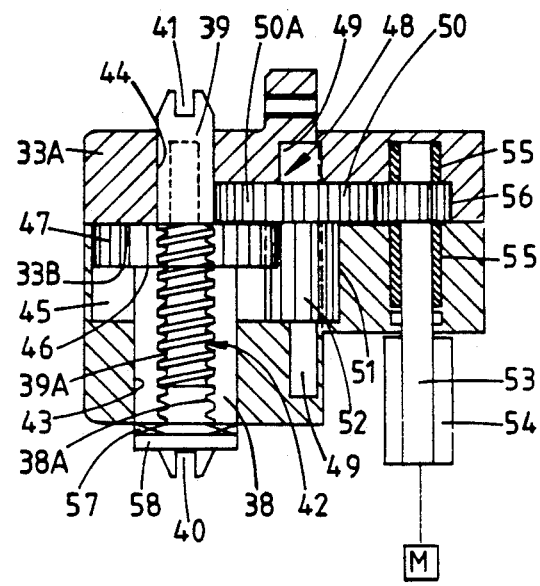
FIG. 7 is a cross-section along the line Y—Y of FIG. 6 illustrating an actuator of the brake in a first mode of operation.
Figure 8:
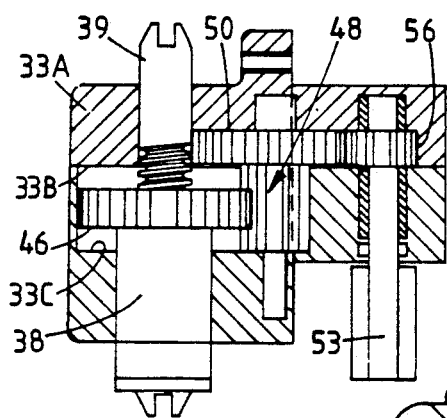
FIG. 8 is a view similar to FIG. 7 illustrating the actuator in a different mode of operation.

The actuator 33 is illustrated in greater detail in FIGS. 6 to 8 and will be seen to include a housing 33A, which for manufacturing convenience may be composed of a number of initially separate components. The housing has a pair of co-axially aligned bores 43, 44 of different diameters which receive respectively the brake applying members 38, 39 therethrough. The housing defines, between the bores 43, 44, a space 45 which receives an enlarged flange 46 forming part of the brake applying member 38 and having gear teeth 47 on its outer periphery.

The housing 33A also contains an intermediate gear member, indicated generally at 48 which is rotatably supported in recesses of the housing by oppositely directed coaxial spigots 49. The gear member 48 has a relatively large diameter flange 50, of which the external periphery is provided with gear teeth 50A. Lying at the side of the flange 50 remote from the adjacent spigot 49 is an intermediate cylindrical portion 51, of which the axial length is approximately twice that of the flange 46 and which is provided with gear teeth 52 meshing with the teeth 47 on the flange 46. The intermediate gear member 48 is constrained against axial movement by engagement with opposed surfaces of the oousing, but the brake applying member 38 and flange 46 carried thereby are able to move axially relative to the intermediate gear member, whilst maintaining meshing engagement by virtue of the extended gear profile 52. A force input rod 53, surrounded externally by a protective sheath 54, extends within the housing and is rotatably supported in the latter by bearing bushes 55. The input rod 53 carries a spur gear pinion 56 for rotation therewith and arranged in driving engagement with the teeth 50A of the intermediate gear member 48. The spur gear 56 is restrained against axial movement by opposed surfaces of the housing. The rod 53 would normally be connected to a suitable electric motor, indicated diagrammatically at M, from which it applies driving force to the actuator via the spur gear 56.

The threaded connection 42 between the members 38 and 39 consists of an externally threaded portion 39A of the member 39 engaging an internal thread formation 38A of the member 38. Since the respective ends of the members 38 and 39 are engaged with the brake shoes 31, 32 by means of slots 40, 41 and are therefore not able to rotate, it is necessary for one of the members to rotate to enable the screw thread connection to produce relative axial movement between the two. In this embodiment, this is achieved by inserting a thrust bearing 57 between the outer end of the member 38 and a separate non-rotatable shoe contacting member 58 in which the slot 40 is formed.

When it is desired to operate the actuator in order to separate the shoes 31, 32, the motor M is energised to rotate the rod 53 and, with it, the spur gear 56. This drives the intermediate gear member 48 via the teeth 50A on the flange 50 of the latter and this in turn, by way of the long profile gear portion 52 of the gear member 48 drives the brake applying member 38 by way of the flange 46.

It will be seen that, in this particular arrangement, two stages of gear reduction are obtained, these being respectively between the spur gear 56 and flange 50 and between the long profile gear portion 52 and flange 46.

Rotation of the brake-applying member 38 causes outward movement of the brake-applying member 39 and, since the assembly 38, 39 is floating within the housing, an equal and opposite movement of the brake applying member 38 will occur and balanced actuating forces will be applied to the shoes 31 and 32. The thrust bearing 57 enables the member 38 to rotate relative to the stationery end member 58.

FIG. 7 illustrates the actuator in its rest position, with the flange 46 against a face 33B of the housing, and operation thereof in the manner described will, for example, move the components to intermediate positions shown in FIG. 8, which assumes the actuated brake to be in a part worn condition. For this condition, the flange 46 lies approximately mid-way between the face 33B and an opposed face 33C of the housing. With the brake shoes 31, 32 in the fully worn condition, relative axial movement between the parts 38 and 39 would be such that the flange 46 would contact said opposed face 33C which faces in a direction opposed to the direction of outward movement of the member 38.

Figure 9:
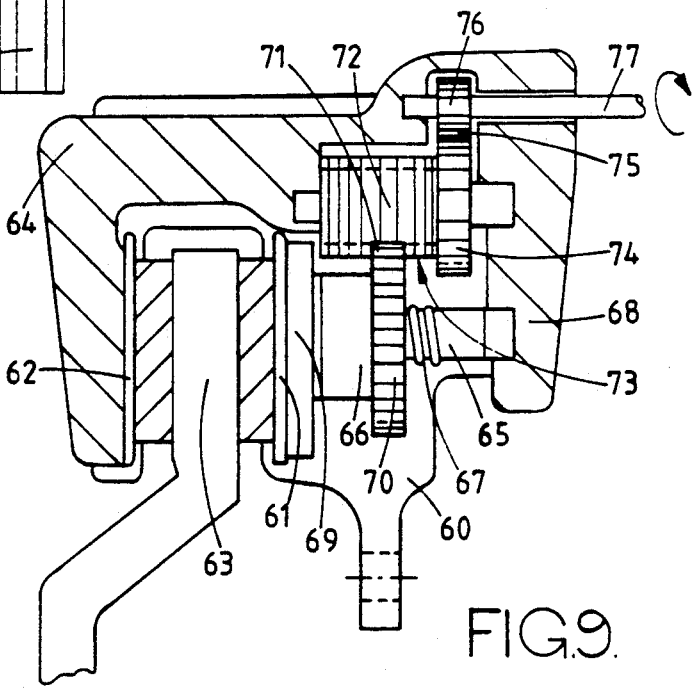
FIG. 9 is a transverse cross-section of a disc brake forming part of an alternative form of the braking system of the invention.

FIG. 9 illustrates the actuator of the invention embodied in a vehicle disc brake. The brake includes a fixed carrier 60 which supports a pair of friction assemblies 61, 62 disposed at either side of a rotatable brake disc 63. A calliper 64 is slidably arranged in relation to the carrier 60 and embraces the outer peripheral portion of the disc, in conventional manner.

As previously, the actuator includes an extensible strut composed of an externally threaded screw component 65 and an internally threaded nut component 66 interengaged by way of a threaded connection, part of which can be seen at 67. The screw component 65 is carried by a tail portion 68 of the calliper 64 in non-rotatable manner. The nut 66 engages the pad assembly 61 by way of a thrust bearing 69 and is supported either by the pad assembly 61 or by the carrier 60 or partly by both of these components. The nut has a flange 70 of relatively large diameter, the outer periphery which forms a gear profile 71. This meshes, as previously, with a relatively long profile portion 72 of an intermediate gear member 73 rotatably mounted in the calliper 64 and itself having a relatively large diameter flange 74 with an external gear profile 75 which meshes, as previously, with a force input spur gear 76 driven from a power device, such as an electric motor (not shown) by way of a force transmission device in the form of a rod or cable 77.

In operation, the spur gear 76 is rotated by operation of the electric motor and, via the intermediate gear member 73, rotates the nut 66 of the extensible strut. The strut extends to urge the pad assembly 61 into engagement with the disc 63 and, simultaneously, moves the calliper 64 to the right in order to apply the pad assembly 62 against the disc also. With the pads in engagement with the disc, clamping force is applied to the disc directly from hhe actuator via the pad assembly 61 and the pad assembly 62 is applied, by reaction, via the calliper 64.

The actuator described, in addition to being simple and robust, enables a number of ancillary functions to be performed, particularly when the drive motor is a stepper motor, of which the position at any instant in relation to a datum position is accurately known and may be stored in a computer.

It will be appreciated that, although the illustrated embodiments of the actuator make provision for a two stage gear reduction between the input pinion and extensible strut, it would be possible to engage the input spur gear directly with the long profile gear, which would result in only a single gear reduction stage. The actuator may be employed, as appropriate, in any form of internal shoe drum brake or disc brake forming part of the vehicle braking system of the invention.

We claim:

1. A vehicle braking system for braking a wheel carried by a suspension member of the vehicle, comprising a brake actuator mounted at a location adjacent said wheel, a discrete electronically-operated power device for operating the actuator and carried by the suspension member at a separate location remote from the brake actuator and drive transmission means interconnecting the power device and brake actuator.

2. A braking system according to claim 1, wherein the power device is carried by said suspension member adjacent a location at which the member is connected to the suspended vehicle body.

3. A braking system according to claim 2, wherein the suspension member is connected to the body by way of a noise isolation device and the power device is disposed at the wheel side of said isolation device.

4. A braking system according to claim 3, wherein said noise isolation device is a resilient bush.

5. A braking system according to claim 1 wherein said power device is carried on an upper surface of said suspension member.

6. A braking system according to claim 1, wherein said power device is carried on a rearwardly facing side of said suspension member.

7. A braking system according to claim 1 wherein said power device is an electronic motor.

8. A braking system according to claim 7, wherein said power device is a stepper motor and said transmission means transmits rotary drive from the motor to the actuator.

9. A braking system according to claim 7, wherein said power device is a solenoid and said transmission means transmits linear drive from the solenoid to the actuator.

10. A braking system according claims 1 wherein the brake actuator comprises a housing containing a pair of brake applying members interengaged by way of a threaded connection to form a strut of which the length is variable by relative rotation of the members, one of said members having a gear formation thereon meshing with a corresponding formation on a drive gear in such a manner as to form a drive connection which permits simultaneous rotational and translational movements of said one member relative to the drive gear, whereby rotation of the drive gear by motive means causes expansion and contraction of the strut for brake actuation.

11. A braking system according to claim 10, wherein the actuator drive gear has a longer gear profile than said one member in order to permit said simultaneous rotational and translational movements of said one member.

12. A braking system according to claim 10 wherein said one member is of larger diameter than said drive gear in order to provide an input gear reduction.

13. A braking system according to claim 10 wherein extension and contraction of the strut are effected by rotation of said one member having the gear formation thereon in respective opposed directions.

14. A braking system according to claim 10, wherein said drive gear is provided with a further gear formation of larger diameter than the drive gear which meshes with a spur pinion of smaller diameter than said further gear formation to provide a further stage of input gear reduction, said spur pinion being drivable by said motive means via a rotatable drive input member, said input member being a component of said drive transmission means.

* * * * *